DEVICE COMPOSED OF DIFFERENT SEMICONDUCTIVE MATERIALS

Filed Dec. 22, 1960 2 Sheets-Sheet 1

INVENTOR
THEODORE C. TAYLOR
BY Joseph D. Pannone
ATTORNEY

March 30, 1965 T. C. TAYLOR 3,176,204

DEVICE COMPOSED OF DIFFERENT SEMICONDUCTIVE MATERIALS

Filed Dec. 22, 1960 2 Sheets-Sheet 2

INVENTOR
THEODORE C. TAYLOR
BY Joseph D. Pannone
ATTORNEY

United States Patent Office 3,176,204

Patented Mar. 30, 1965

3,176,204

DEVICE COMPOSED OF DIFFERENT SEMICONDUCTIVE MATERIALS

Theodore C. Taylor, South Lincoln, Mass., assignor to Raytheon Company, Lexington, Mass., a corporation of Delaware Filed Dec. 22, 1960, Ser. No. 77,735
2 Claims. (Cl. 317—237)

This invention relates generally to the manufacture and fabrication of semiconductive devices, and more particularly to the utilization of new materials in the device structure, and to the novel structures resulting therefrom.

Semiconductive devices are now known in which a body of semiconducting material is provided in its crystal structure with impurity elements which alter the electrical conductivity characteristics of the body in order to influence the flow of electrical current carriers through the device. The type of impurity material used may be either N-type in which the conduction occurs principally by electrons, or P-type material in which the electrical conduction takes place principally by the flow of holes. In the past, devices of this type have been made by introducing the impurity material into the semiconductive body by various processes, as, for example, by alloying or by the gaseous diffusion of the impurity into the body.

The present invention involves a semiconductive device structure in which the material comprising the device is a combination of at least two different kinds of semiconducting material with a rectifying junction being formed at the interface of the two different semiconductive materials themselves rather than being included within a body of semiconductive material of a single kind as is done in the prior art type of procedure. In one of its aspects, the present invention involves the discovery that the compound aluminum carbide possesses semiconductive properties, and therefore may be utilized either alone or in combination with other semiconducting materials to fabricate the devices. In still another aspect of the present invention, it has been found that rectifying junctions may be formed between two regions of different semiconductive material, as, for example, between aluminum carbide and silicon carbide. Since the aluminum carbide has been found to possess a higher energy gap than either germanium or silicon, the use of aluminum carbide presents attractive device potentialities with respect to high temperature operation over those heretofore known in the art. Further, it has been found that devices which are easier to make in a more reproducible manner from the use of a substantially pure aluminum pellet alloyed to a silicon carbide body in order to manufacture the device.

The invention will be better understood as the following description proceeds, taken in conjunction with the accompanying drawings wherein.

Figure 1:
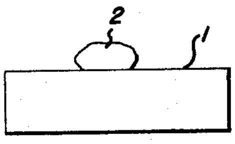
FIG. 1 is a greatly exaggerated pictorial representation of a body of semiconductive material prior to the introduction of an aluminum pellet.
Figure 2:
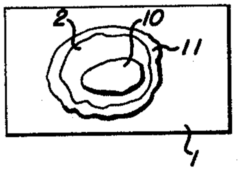
FIG. 2 is a top view of the body of FIG. 1 showing the distribution of crystals of aluminum carbide which have been found to form on the silicon carbide body after fusion.

Referring now to the drawings, and more particularly to FIG. 1 thereof, there is shown an assembly of an N-type silicon carbide chip 1 and an appropriate aluminum pellet 2 prior to fusion of the aluminum onto the silicon carbide. The assembly as shown in FIG. 1 may be placed into an appropriate furnace and then raised to an elevated temperature in order to cause fusion. In FIG. 2, the assembly is shown after fusion and cooling have taken place and the portions indicated by the numerals 10 and 11, respectively, represent the formation of aluminum carbide crystals on the aluminum droplet and on the silicon carbide chip. These crystals were found to be in the physical form of small hexagonal crystals which were yellow in color, and chemical and X-ray study confirmed the fact that the regions 10 and 11 comprised aluminum carbide. It was further found that the aluminum carbide film formed in the silicon carbide crystal extends over the entire surface wet by the aluminum pellet. This was determined by removing the major amount of the excess aluminum by chemical reaction with gold, and then removing any small amount of aluminum which remained by etching in a hot solution of sodium hydroxide which attacks the aluminum more rapidly than it attacks aluminum carbide.

Figure 4:
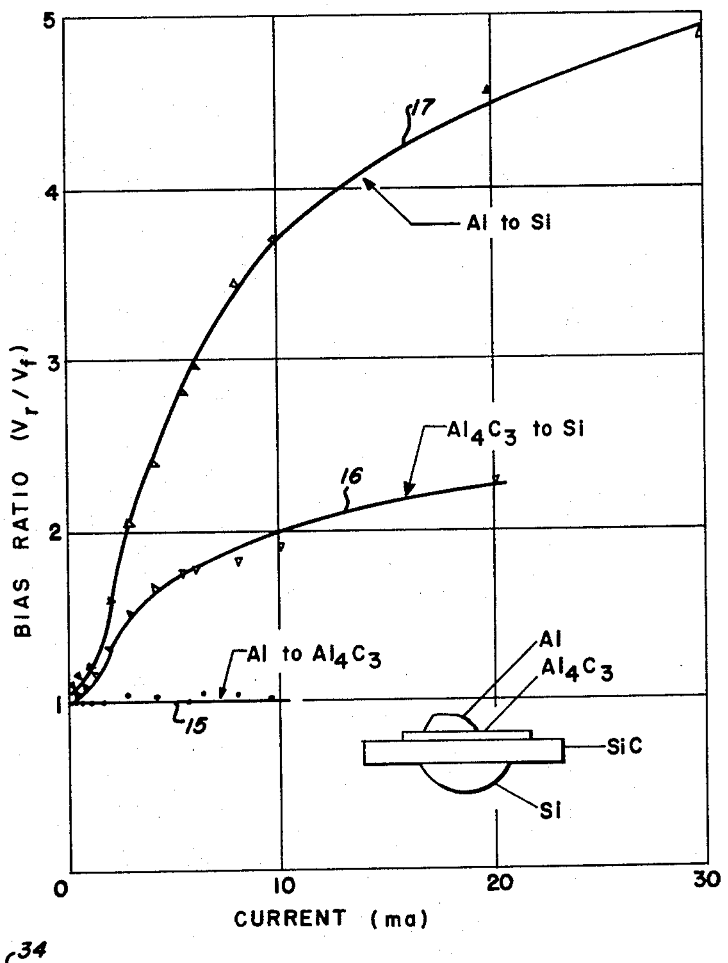
FIG. 4 is a graph showing the reverse and forward characteristics obtained in a diode structure fabricated in accordance with the present invention.

In order to determine the electrical characteristics of a structure such as shown in FIG. 2, a point contact electrode was connected to the film 11 and separate pressure contacts were made to the aluminum 2 and to a phosphorus-doped silicon electrode which was alloyed to the opposite side of the chip to provide an essentially ohmic contact. The curves of FIG. 4 are plotted to show the ratio of reverse to forward bias required for the values of current plotted on the abscissa scale. Line 15 which was obtained by measurements between the aluminum and the aluminum carbide on a device structure such as shown in exaggerated form in the lower right hand corner of FIG. 4 indicates that no rectification took place when a bias was established between these two materials. However, when a bias voltage was established between the aluminum carbide and the phosphorus-doped silicon electrode attached to the silicon carbide chip, line 16, of FIG. 4 indicates the rectification characteristics which were found to exist. Similarly, when an appropriate bias voltage was placed between the aluminum portion of the dot and the silicon electrode attached to the main body of the silicon carbide chip, increased rectification characteristics were found to exist as indicated by the line 17 in FIG. 4. The reduced rectification shown by the line 16 is believed to be the result of the resistance introduced by the point contact and by spreading resistance associated with the aluminum carbide film. From these measurements, however, it is clear that rectification in the structure is associated with the interface between the aluminum carbide and the silicon carbide, since the phosphorus-doped silicon electrode is known to be an ohmic contact. Thus, the rectification takes place between two adjacent semiconductor materials, rather than between doped regions of the same kind of semiconductor material.

Other independent measurements which were made on the small aluminum carbide crystals indicate that aluminum carbide is a semiconductor material, and the fact that the crystals are quite transparent indicates that the material possesses a relatively large energy gap. Thermoelectric probing of the aluminum carbide crystals has indicated that the crystals are probably P-type. Thus, it appears to be well established that rectifying contacts made in accordance with the structure shown in FIG. 2 are, in reality, junctions formed between P-type aluminum carbide and N-type silicon carbide.

In carrying out the fabrication of the structure described above, the assembly shown in FIG. 1 was placed in a conventional graphite strip-heater type of furnace which utilized lamp black for thermal insulation. The aluminum dot 2 is preferably composed of substantially pure aluminum, that is, on the order of 99.9% to 99.999% aluminum, since the best recification characteristics are thereby achieved. Reducing the aluminum content of the pellet 2 tends to degrade or substantially destroy the useful rectification characteristics of the device. However, it should be understood that this effect is dependent on the kind of impurity which may be included in the aluminum and that greater percentages of impurity material which does not prevent the formation of aluminum carbide and/or does not adversely dope the aluminum carbide may be tolerated without detracting from the useful rectification characteristics. In general, the best rectification properties were derived by the use of a rapid fusion cycle in which the aluminum and silicon carbide were heated to a temperature in the range 1500° to 1800° C. over a time period of 30 to 40 seconds. This was followed by rapid cooling of the fused unit to room temperature during a time period on the order of 1 to 2 minutes. During the firing cycle, the furnace was flushed with an atmosphere of an inert gas, such as argon.

Figure 5:
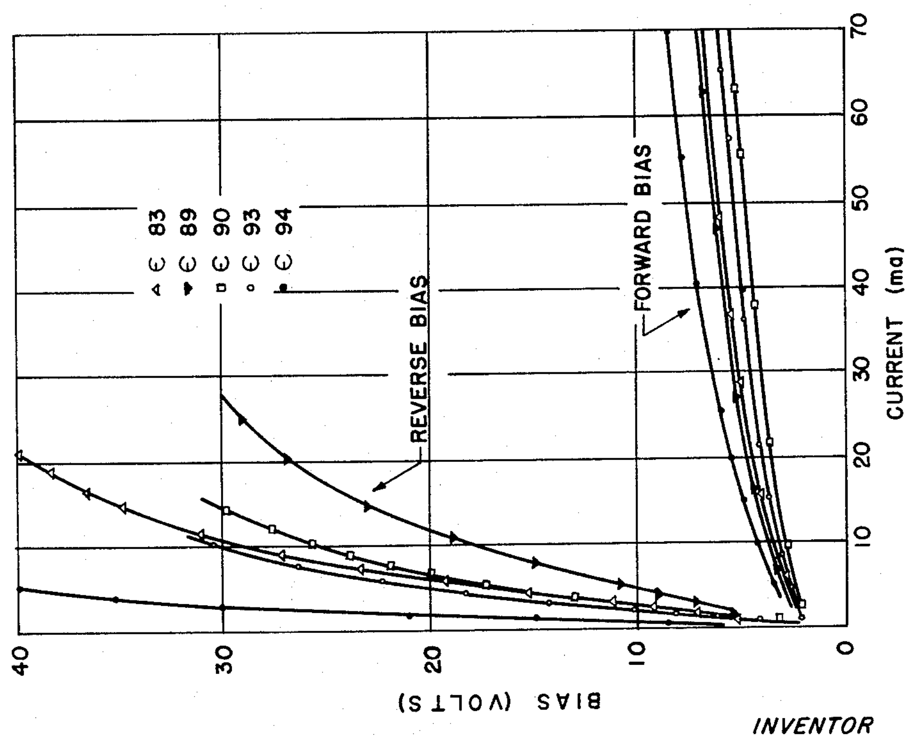
FIG. 5 is a graph showing the direct current characteristics of a number of such devices.

In FIG. 5, the electrical characteristics of five typical fused aluminum carbide-silicon carbide rectifiers measured at room temperature are shown. All of the rectifiers utilized a phophorus-doped silicon contact as the non-rectifying electrode. The various numbers indicated in the top right hand corner of the graph represent identifying numbers which were assigned to the units. As can be seen, many of the units exhibit good rectifying action even though no subsequent processing has been carried out. However, the characteristics normally can be improved somewhat by etching a given unit in concentrated hydrochloric acid for about two minutes. This etching solution is preferably used because of its ability to clean off any evaporated aluminum which might overlap the edges of the junction as a result of the high fusion temperatures which are used in the process. The units of FIG. 5 had rectifying contacts ranging from 0.6 to 1.0 mm. in diameter, while the thickness of the silicon carbide chips ranged from 0.025 to 0.4 mm.

Figure 6:
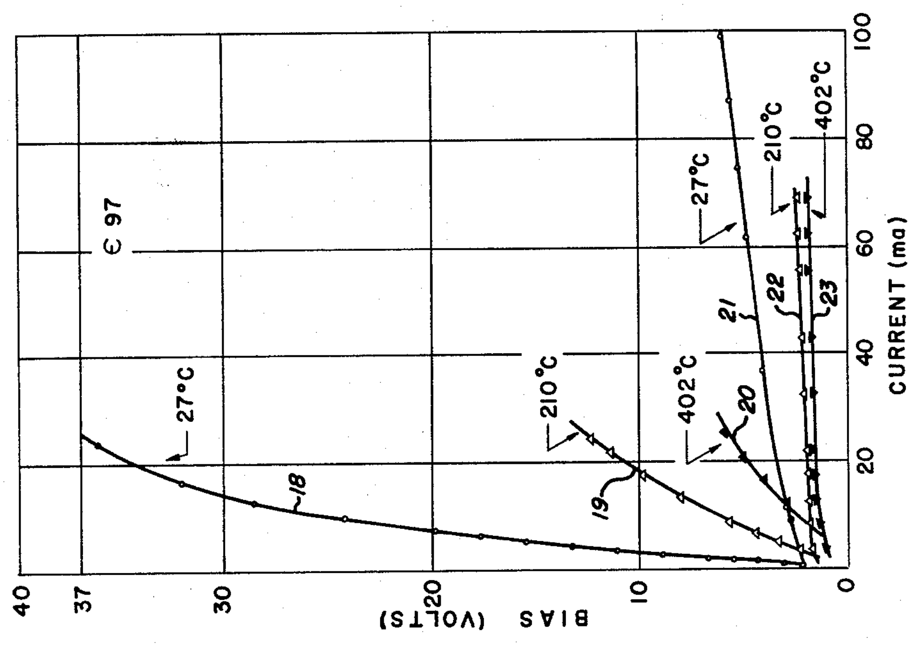
FIG. 6 is a graph showing the effect of various temperatures upon the direct current characteristics of such a device.

In FIG. 6 there are shown characteristics for an aluminum carbide-silicon carbide rectifier measured at different ambient temperatures. The lines 18, 19 and 20 represent the reverse characteristic at the temperatures respectively indicated, while lines 21, 22 and 23 represent the corresponding forward characteristics at these same respective temperatures. As can be seen, rectification exists even up to temperatures in the 400° C. range, since the forward characteristic improves with the increasing temperature, thereby tending to compensate for the degradation of the reverse characteristic with increasing temperature. Devices conventionally in use, that is, devices made of germanium or silicon, are restricted to operation at temperatures well below those at which devices in accordance with the present invention can be successfully utilized.

Figure 3:
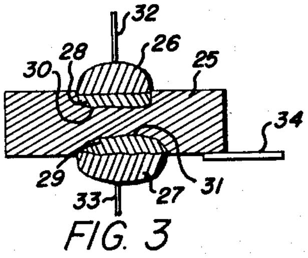
FIG. 3 is a greatly exaggerated cross-sectional view showing the position of the various semiconducting regions in a device of the transistor type.

Referring now to FIG. 3, there is shown a transistor-type structure according to the present invention as contrasted to the diode structures previously described. In this figure, the silicon carbide chip 25 is provided with aluminum pellets 26 and 27 alloyed to opposite faces thereof to form rectifying contacts. The regions 28 and 29 indicate the layers of aluminum carbide formed below the pellets, while the rectifying junctions between the aluminum carbide and the main silicon carbide body are depicted by the lines 30 and 31. Although the junctions 30 and 31 are shown for the purposes of clarity as being well below the surface of the chip 25, it should be understood that in actual fact the penetration of the aluminum carbide layer is very slight and these contacts can therefore be considered as substantially non-penetrating. After fabrication of the structure, appropriate conducting leads 32, 33 and 34 are attached to respectively constitute the emitter, collector, and base leads of the transistor.

Although there have been described what are considered to be preferred embodiments of the present invention, various adaptations and modifications thereof may be made without departing from the spirit and scope of the present invention as defined in the appended claims.

What is claimed is:

1. A semiconductive device comprising a body of silicon carbide, a region of aluminum carbide in contact with said body of silicon carbide, the interface between said aluminum carbide and said silicon carbide constituting a rectifying barrier, and conducting leads electrically connected respectively to said aluminum carbide region and to said silicon carbide region.

2. A semiconductive device comprising a body of silicon carbide, a layer of aluminum carbide disposed adjacent said silicon carbide body, a quantity of substantially pure aluminum in contact with said aluminum carbide region, and conducting leads electrically connected respectively to said silicon carbide body and to said aluminum carbide layer.

References Cited by the Examiner

UNITED STATES PATENTS

| | | | |
|---|---|---|---|
| 2,629,672 | 2/53 | Sparks | 317—235 |
| 2,831,787 | 4/58 | Emeis | 148—1.5 |
| 2,846,340 | 8/58 | Jenny | 148—33.4 |
| 2,918,396 | 12/59 | Hall | 148—1.5 |
| 2,929,859 | 3/60 | Loperski | 148—33.4 |

DAVID J. GALVIN, *Primary Examiner.*

SAMUEL BERNSTEIN, BENNETT G. MILLER, DAVID J. GALVIN, *Examiners.*